United States Patent [19]
Holland

[11] Patent Number: 5,174,275
[45] Date of Patent: Dec. 29, 1992

[54] WIDE-ANGLE SOLAR CONCENTRATOR

[76] Inventor: Beecher J. Holland, 600 Morison Ave., Kingsport, Tenn. 37660

[21] Appl. No.: 795,701

[22] Filed: Nov. 21, 1991

[51] Int. Cl.⁵ ................................................. F24J 2/18
[52] U.S. Cl. .................................................... 126/684
[58] Field of Search ................................ 126/438, 439

[56] References Cited

U.S. PATENT DOCUMENTS

| | | | |
|---|---|---|---|
| 4,166,446 | 9/1979 | Youngs | 126/438 |
| 4,266,858 | 5/1981 | Holland | 350/296 |
| 4,286,580 | 9/1981 | Sitnam | 126/438 |
| 4,311,132 | 1/1982 | van Kuijk | 126/438 |
| 4,396,008 | 8/1983 | van Kuijk | 126/438 |
| 4,543,946 | 10/1985 | Gill et al. | 126/438 |
| 4,561,424 | 12/1985 | Gill et al. | 126/438 |

FOREIGN PATENT DOCUMENTS 1553800  3/1990  U.S.S.R. ............................ 126/438

*Primary Examiner*—Carroll B. Dority

[57] ABSTRACT

The present invention is a cross-sectional arrangement for solar concentrators which is comprised of a concave reflective boundary, of at least two receiver-converters residing within the concavity, and of additional reflecting means within the field-of-sight of the concave reflective boundary and, preferably, within the confine of the reflective boundary.

2 Claims, 1 Drawing Sheet

WIDE-ANGLE SOLAR CONCENTRATOR

PRIOR ART

| U.S. Pat. Documents | | | |
|---|---|---|---|
| 4.266.858 | 5/1981 | Holland | 350/296 |
| 4.311.132 | 1/1982 | vanKuijk | 126/438 |
| 4.396.008 | 8/1983 | vanKuijk | 126/438 |
| 4.529.831 | 7/1985 | Gill et al | 136/248 |

BACKGROUND OF THE INVENTION

The present invention, a solar concentrator sectional arrangement, consists of a concave reflective boundary and of a first receiver-converter, a general term for varied methods of coverting solar radiation to other useful forms such as heat and electrical energy, emanating outward from the base area of the concavity and of at least a second receiver-converter following outward after the first, the multiple receiver-converters being able to communicate with each other, and, if desired, of additional reflecting means which may be within the concavity and may be within the field-of-sight of the concavity.

U.S. Pat. No. 4,266,858 is a duplicate-in-part forerunner (which has been tested by scale models and shown workable) by Holland of the present invention and differs from it in that the present invention provides for at least a second receiver-converter and for reflecting means, in addition to the reflective concave boundary, within the geometric purview (the field of sight from the base of the concavity) of the concave reflective boundary.

The embodiment presented in this specification appears capable, by using appropriate dimensions, of attaining a greater concentration ratio and or efficiency than obtainable with the referenced inventions.

The efficacy of more than one receiver-converter (strictly heat absorbers in some references) for increasing efficiency of sunlight utilization in related devices has been pointed out by others. The efficacy for the present invention is for an additional, different and more signifigant purpose and result for the present invention as discussed below.

The present invention utilizes the second receiver-converter for an additional, different application and result (to my knowledge new to the literature) of marked importance (and a signifigant objective) for some overall embodiments utilizing the present invention. In the instance of application of the present invention as the cross-section design of an end-to-end tilted, linear trough for the heating of a liquid in the two receiver-converters which run lengthwise in the trough and transport the liquid, the first receiver-converter (in the base of the trough) is the hot tube normally and the second receiver-converter is the "cold" tube. The placement of both the hot and "cold" tubes in the trough more nearly assures (by placing both tubes in the same environment) that both tubes will achieve the same temperature at the same time during an extended absence of sunlight. Such is important because said embodiments depend on passive, natural circulation (with no pumping, no valves, no draining of tubes at night) from a reservoir, down the "cold" tube and back up the hot tube to the reservoir as a result of the liquid in the hot tube being less dense than that in the "cold" tube. In a prolonged absence of sunlight to the trough, it is important that both hot and "cold" tubes attain the same temperature to avoid circulation and thus avoid cooling the reservoir contents. Both tubes enter the reservoir from essentially the same level.

It is quite possible that the hot and "cold" tubes may exchange roles depending on how the additional reflecting means are used and on the dimensions of the tubes.

Note that the first paragraph above does not fix placement of the multiple receiver-converters except that one follows another. Such is intentional, as previous analytical study has shown that placement other than along the longitudinal centerline of the cross section can have the effect of reducing variation in concentration ratio with different angles of incoming radiation.

The inclusion of additional reflectors within the concave reflective boundary and within the geometric sight of the concave boundary can be useful for increasing efficiency, concentration ratios and productivity by intercepting portions of insolation that would otherwise be lost by reflection out of the cavity or would be intercepted by the "cold" receiver-converter and redirecting them onto the hot receiver converter, making for greater sensitivity to whatever natural radiation level is available, higher possible temperatures from thermal devices, more affordable equipment to do a given job, and possibly greater productivity from photoelectric devices. It appears evident that placement of additional reflective means within the confines of the concave boundary is more suitable to preassembled collector devices than placement outside the boundary. Limited analytical studies of such additional reflectors have shown them advantageous.

The object of the present invention is to provide a highly efficient, economically competitive solar collector capable of signifigant concentration ratios for possible application to thermal devices and to photoelectric devices and to combination thermal and photoelectric devices.

SUMMARY OF THE INVENTION

The present invention, a concave solar concentrator cross-sectional arragement, is comprised of a reflective concave boundary, at least one receiver-converter emanating from the base area of the concavity and preferrably, at least a second receiver-converter, the second following after the first, wherein the multiple receiver-converters may communicate with oneanother and of additional reflecting means within the geometric purview of the reflective concave boundary.

BRIEF DESCRIPTION OF THE DRAWING

The object, design and functioning of the invention will be clarified hereinafter by this specification with reference to the accompanying drawing wherein.

DESCRIPTION OF THE PREFERRED EMBODIMENT

Figure 1:
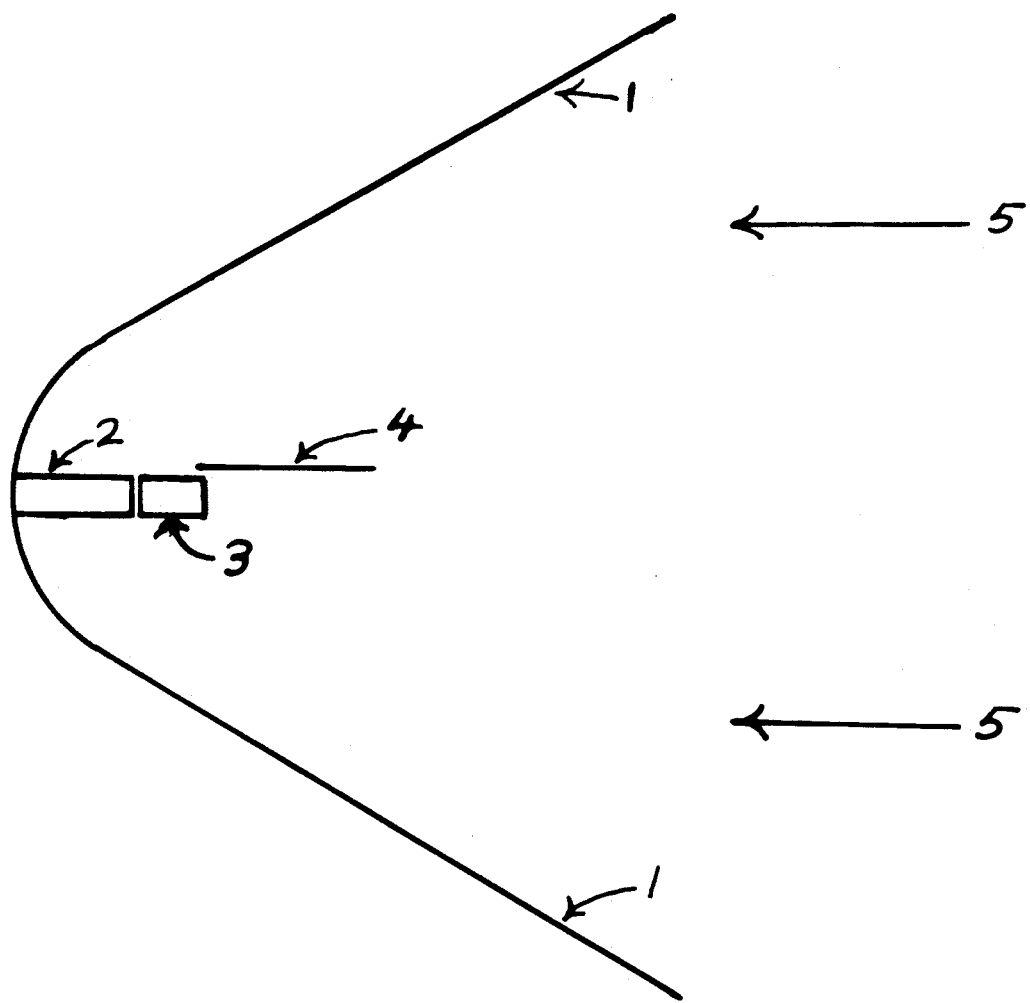
FIG. 1 is one embodiment of the cross-sectional arrangement invented.

Referring to FIG. 1, the concentrator cross section consists of a concave reflective boundary item 1 which is comprised of a circular section base area and of straight tangential extensions from the circular section; the cross section consists further of first receiver-converter item 2 and second receiver-converter item 3, both receiver-converters being essentially symmetrical about the cross-sectional longitudinal centerline wherein the two receiver-converters may communicate with eachother and wherein the summation of the two extend no further than slightly beyond the center of curvature of the circular base section and further consists of additional reflecting means item 4 within the confines of the reflective boundary. Item 5 is sunlight.

The first preferred embodiment is as presented by FIG. 1 and its description. Reflective boundary item 1 is readily formed from galvanized sheet in the instance of a linear trough. The first and second receiver-converters items 2 and 3 can be formed from copper tubing, and the additional reflector item 4 may be cut from galvanized sheet and be supported by sufficiently heavy wire. If the concave boundary is formed from a heat conducting material, it is desirable to place a thin strip of insulation between the boundary and the first receiver-converter. The embodiment could be used, for one example, with the application described in the prior Background Of The Invention. The embodiment has been tested with a scale model and appears productive.

I claim:

1. A solar concentrator cross-sectional arrangement consisting of a concave reflective boundary and
   a first receiver-converter emanating outward from the base area of the concavity and,
   of at least a second receiver-converter following outward after said first, the multiple receiver-converters being able to communicate with eachother wherein
   the summation of said receiver-converter is well away from the cross section area where light enters and occupies a minor portion of the maximum distance from where said first receiver-converter emanates to said area where light enters within the concavity and wherein,
   the first receiver-converter occupies a larger portion of the length of said distance to where light enters within the concavity than does any single subsequent receiver-converter and
   of additional reflecting means which are within the concavity and within the field-of-sight of the concavity wherein
   the additional reflecting means are physically separate from said receiver-converter and set to increase the radiation received by the first receiver-converter at the expense of secondary receiver-converters as well as by reducing reflection back to the atmosphere and
   the additional reflecting means lay essentially parallel to the longitudinal cross-sectional centerline of said concave reflective boundary and slightly removed from said centerline as seen in said cross-sectional arrangement.

2. A solar concentrator cross-sectional arrangement as in claim 1 wherein the concave reflective boundary is comprised of a circular section base area and of straight tangential extensions from the circular section and wherein:
   the cross section incorporates said first and second receiver-converters, both being essentially symmetrical about the cross-sectional longitudinal centerline wherein the summation of the two receiver-converters extends no further than slightly beyond the center of curvature ofthe circular base section and wherein:
   the cross section incorporates said additional reflecting means within the confines of the concave reflective boundary.

* * * * *

UNITED STATES PATENT AND TRADEMARK OFFICE
CERTIFICATE OF CORRECTION

PATENT NO. : 5,174,275

DATED : 12-29-92

INVENTOR(S) : Beecher J. Holland

It is certified that error appears in the above-identified patent and that said Letters Patent is hereby corrected as shown below:

Column 3, line 33 <u>Reads</u>   --- receiver-converter---
    <u>should read</u>   ---receiver-converters---

Column 4, line 11 <u>Reads</u>   ---receiver-converter---
    <u>should read</u>   ---receiver-converters---

Column 4, line 11 <u>Reads</u>   ---set---
    <u>should read</u>   ---act---

Signed and Sealed this

Second Day of November, 1993

Attest:

BRUCE LEHMAN

*Attesting Officer*      *Commissioner of Patents and Trademarks*